US011101724B1

(12) United States Patent
Christensen

(10) Patent No.: US 11,101,724 B1
(45) Date of Patent: Aug. 24, 2021

(54) HYBRID VARIABLE RELUCTANCE MOTOR PROPULSION SYSTEM

(71) Applicant: Brian Russell Christensen, Willard, UT (US)

(72) Inventor: Brian Russell Christensen, Willard, UT (US)

(73) Assignee: Brian Russell Christensen, Willard, UT (US)

( * ) Notice: Subject to any disclaimer, the term of this patent is extended or adjusted under 35 U.S.C. 154(b) by 0 days.

(21) Appl. No.: 16/279,867

(22) Filed: Feb. 19, 2019

(51) Int. Cl.
*H02K 19/10* (2006.01)
*H02K 7/18* (2006.01)
*H02P 25/08* (2016.01)

(52) U.S. Cl.
CPC ......... *H02K 19/103* (2013.01); *H02K 7/1846* (2013.01); *H02P 25/08* (2013.01)

(58) Field of Classification Search
CPC ...... H02K 19/103; H02K 19/10; H02K 19/16; H02K 19/20; H02K 7/1846; H02K 7/1861; H02K 41/00; H02K 41/06; H02K 53/00; H02P 25/08
USPC .......................................... 310/75 C; 290/1 R
See application file for complete search history.

(56) References Cited

U.S. PATENT DOCUMENTS

| 4,247,785 A * | 1/1981 | Apgar | H02K 49/10 |
| | | | 290/1 R |
| 8,109,353 B2 | 2/2012 | Gurol | |
| 2004/0100100 A1 * | 5/2004 | Wilson | F03G 7/08 |
| | | | 290/1 R |
| 2008/0303355 A1 * | 12/2008 | Fiske | B61C 11/00 |
| | | | 310/12.09 |
| 2009/0173589 A1 * | 7/2009 | Nejmeh | H02K 7/1853 |
| | | | 191/2 |
| 2016/0052398 A1 * | 2/2016 | Richards | B60L 53/39 |
| | | | 191/10 |
| 2016/0329803 A1 * | 11/2016 | Burigo | H02K 41/06 |

FOREIGN PATENT DOCUMENTS

WO   WO 2015/118416   8/2015

OTHER PUBLICATIONS

Krishnan, R., Industrial Electronics Series, "Switched Reluctance Motor Drives", CRC Press (2001).
Ashen, R. A., Bolton, H.R., IEE Proc., vol. 128, Pt. B. No. 6, "Aspects of the Hypocycloidal Reluctance Motor" (Nov. 1981).
Reinert, J., et al., IEEE Transactions of Industry Applications, vol. 31, No. 2., Digital Control and Optimization of a Rolling Rotor Switched Reluctance Machine: (Mar./Apr. 1995).
Franke, M., et. al., IEEE 33$^{rd}$ Int. Spring Seminar on Electronics Technology, "Magnetic Equivalent Circuit Modeling of Rolling Rotor Switched Reluctance Motors" (2010).

* cited by examiner

*Primary Examiner* — Michael Andrews

(57) ABSTRACT

An improved vehicle propulsion system using a hybrid variable reluctance motor (VRM) system which allows for: diversified power sources for typical roadway vehicles, and gradual fleet and roadway implementation. In one embodiment, all of the components that are required for a typical vehicle to use the hybrid VRM system can be intergraded in a non-obstructive manner into typical vehicle components. In one embodiment, the vehicle operator selectively determines the amount of propulsive energy that comes from the on-board engine and the amount that comes from the VRM system.

7 Claims, 9 Drawing Sheets

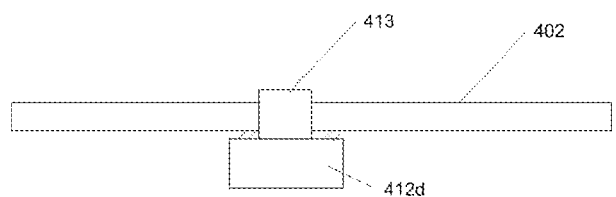
FIG. 4A
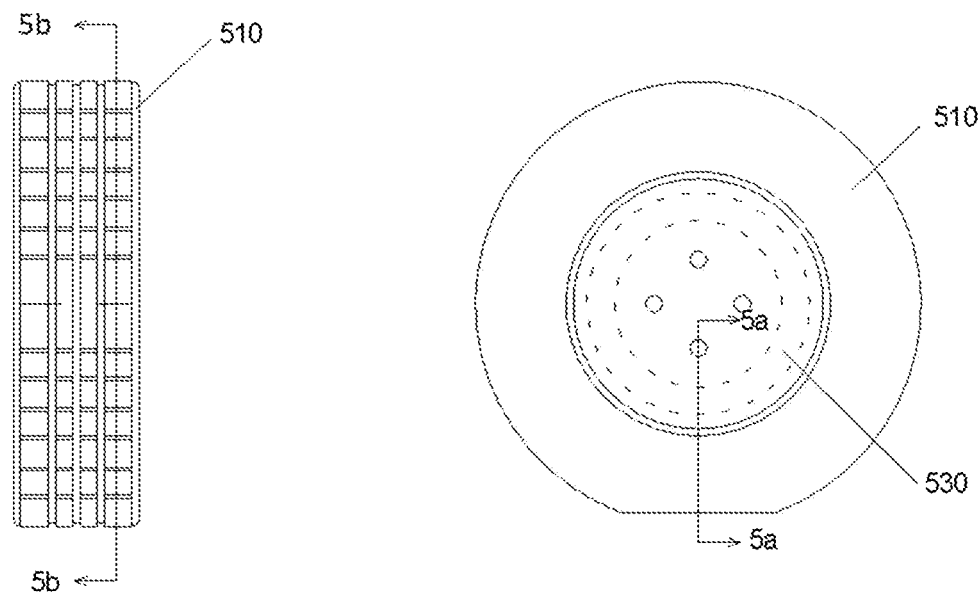
FIG. 5A
Fig. 5
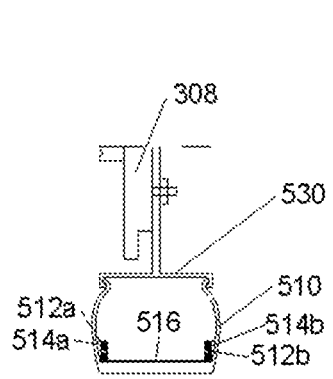
FIG. 5B
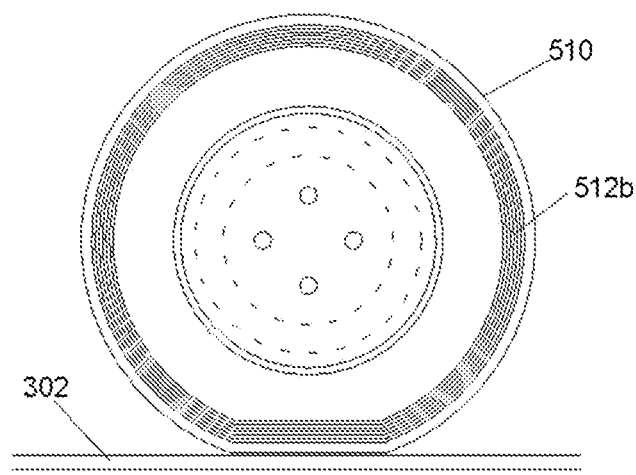
FIG. 5C

HYBRID VARIABLE RELUCTANCE MOTOR PROPULSION SYSTEM

CROSS-REFERENCE TO RELATED APPLICATIONS

This application claims the benefit of provisional patent application Ser. No. 62/632,361, filed 2018 Feb. 19 by the present inventor.

BACKGROUND—PRIOR ART

The following is a tabulation of some prior art that presently appears relevant:

U.S. Patents

| Pat. No. | Kind Code | Issue Date | Patentee |
| --- | --- | --- | --- |
| 8,109,353 | B2 | 2012 Feb. 7 | Gurol |

U.S. Patent Application Publications

| Publication Number | Kind Code | Publ. Date | Applicant |
| --- | --- | --- | --- |
| 2008/0303355 | A1 | 2008 Dec. 11 | Fiske |
| 2016/0329803 | A1 | 2016 Nov. 10 | Burigo |

Foreign Patent Documents

| Foreign Doc. Nr. | Cntry Code | Kind Code | Publ. Date | Applicant |
| --- | --- | --- | --- | --- |
| WO 2015/118416 | Intnl. | H02k | 2015-08013 | Navis |

Nonpatent Literature Documents

Krishnan, R., Industrial Electronics Series, "Switched Reluctance Motor Drives", CRC Press (2001)

Ashen, R. A., Bolton, H. R., IEE PROC., Vol. 128, Pt. B. No, 6, "Aspects of the Hypocycloidal Reluctance Motor" (November 1981)

Reinert, J., et. al., IEEE Transactions of Industry Applications. Vol. 31. No. 2., 37 Digital Control and Optimization of a Rolling Rotor Switched Reluctance Machine: (March/April 1995)

Franke, M., et. al., IEEE 33$^{rd}$ Int. Spring Seminar on Electronics Technology, "Magnetic Equivalent Circuit Modeling of Rolling Rotor Switched Reluctance Motors" (2010)

BACKGROUND

It is well known that electric motors can be used to convert electrical energy into mechanical energy. The most common types of electric motors utilize the well-known Laplace force, which is a force created on a conductor when moving electrical charges flow through the conductor, and when the conductor is in the presence of a magnetic field. In other words, an electric conductor in the presence of a magnetic field, will experience a force transverse to the direction of the current flow on the conductor, when an electric current is applied through the conductor.

Another type of electric motor is a variable reluctance motor. As described in Krishnan, the principal of operation of a variable reluctance motor is explained using the principle of electromechanical energy conversion in a solenoid as shown in FIG. 1. The solenoid has a certain number of electric wire turns creating the coil 106. When the coil 106 is excited with an electric current source 108, the coil 106 sets up a magnetic flux. Increasing the excitation current will make the armature 110 move toward the electromagnet pole legs 102a and 102b, which is are attached to the electromagnet yoke 104 which is fixed. Many people have seen this electromechanical energy conversion in action when using an electromagnet to pick up ferromagnetic material (iron, etc). For this simple system, the input electrical energy W_e, is equal to the sum of the stored energy in the coil W_f and the energy converted into mechanical work, W_m.

Magnetic reluctance is a concept used in describing magnetic circuits, and it is somewhat analogous to electrical resistance, except that electrical resistance dissipates electrical energy as heat, whereas magnetic reluctance stores magnetic energy. In the simple solenoid example above, a simplified representation of the magnetic circuit can be made by considering the reluctance of the armature, pole legs, yoke and air gaps. The electric coil 106 induces a magnetic flux through the circuit. The magnetic circuit representation is shown in FIG. 2, with the pole leg 102a and half of the yoke 104 reluctance shown as reluctance 202a, the air gap "a" reluctance shown as reluctance 220a, armature reluctance shown as reluctance 210, the air gap "b" reluctance shown as reluctance 220b, with the pole leg 102b and half of the yoke reluctance shown as reluctance 202b, and the magnetic flux source shown as 208. The reluctance of the armature 110, pole legs 102a and 102b, and yoke 104 are very low compared to the air gap, and for simplicity can be considered constant, whereas the reluctance of the air gaps is a function of the distance between the armature 110 and pole legs 102a and 102b, with reluctance increasing with increasing distance. The magnetic circuit will tend to the minimum reluctance condition; thus, if the armature is free to move and the magnetic flux is sufficient, the armature 110 will move closer to the pole legs 110a and 110b, converting stored magnetic field energy into mechanical work.

Using these relatively simple principles, a variable reluctance machine can be created. As noted in Krishnan, the origin of the variable reluctance motor can be traced back to 1842, with proposed variable speed applications having been proposed since 1969. More recent interest has come due to the availability of modern high power switching devices that are inexpensive [Krishnan]. Krishnan describes many switching, and control systems known for variable reluctance drives.

The drives described in Krishnan focus on variable reluctance machines which utilize the component of magnetic attractive force between an electromagnet and a ferromagnetic material, permanent magnet, or another electromagnet, which is generally tangent to the face of the electromagnet pole. In these machines the component of force normal to the face of the electromagnet pole is generally reacted through the structure, but does not result in significant mechanical work.

Ashen, et. al., Reinert, et. al., and Franke, et. al., all describe a slightly different configuration of the variable reluctance motor known as the rolling rotor switched reluctance motor. In this configuration both the tangential and normal components of force are used to displace a rolling body about the central axis of the rolling body.

Variable reluctance motors do not enjoy as wide spread application as typical electric motors due to several considerations, one being the higher cost of control systems for variable speed applications.

There is great interest in electrically powered vehicles, stemming from the fact that automobiles and other forms of highway transportation account for a significant portion of the United States' fossil fuel consumption. Gasoline and diesel fuel prices are volatile in part due to the lack of viable alternative fuels; yet no current competitor poses a real challenge to petroleum powered vehicles. Gasoline and diesel powered vehicles are ubiquitous largely due to their exceptional flexibility and range. Automobiles can travel across the United States, including on back roads and undeveloped regions, with ease due to the convenience of on-board storage of the petroleum based fuel, and the widespread availability of the fuel. Petroleum powered engines are also flexible and adaptable in design, allowing for one vehicle to perform well in an off-road environment, towing or hauling situation, and commuting on the highway.

The flexibility and freedom which accompanies standard petroleum powered engines is likely a major reason why other automobile propulsion systems have not been be widely adopted. One example of an alternate vehicle power storage method, which is currently trying to achieve a share of the automotive propulsion business, is an electric battery powered car. Electric batteries for vehicles must have enough capacity to travel a useful distance reliably, and be cost competitive with petroleum, or consumers will not adopt the technology on a large scale. While the battery powered vehicle may be used most of the time for short journeys, the batteries must be sized for a typical medium to long distance journey; this means that excess battery weight is being transported when in use on a short distance trip. This excess battery weight reduces the efficiency of the propulsion system and leads to costly excess material/chemicals. Battery electric vehicles also don't currently serve a large portion of the highway transportation market such as off-road, remote region, and other periodic high power situations (such as trucks used for hauling/towing/transporting).

Capturing just a portion of this market would be extremely lucrative but it has been exceptionally difficult for alternate vehicle power sources to get a foothold due to the fact that our economy and lifestyle are intertwined with the freedom, flexibility and capacity that come with the gasoline powered vehicles.

Technologies which would simultaneously improve efficiency and reduce both cost and emissions, while maintaining the flexibility and freedom associated with our current transportation system, would be attractive to both consumers and governments. The short-term and long-term financial benefits, and improvement in public heath, which would result from a lower cost, lower emission, vehicle propulsion system represents one of the greatest technological opportunities in the last 100 years.

The use of electric motors for road vehicles may have some advantages such as diversifying energy sources for transportation and reduction of pollution. Many systems exist for onboard powered electric motor propulsion, and some have been proposed where the powered portion of the electric motor is placed in the roadway.

U.S. patent application US2008/0303355, applied for by Fiske, recites the concepts of a switched variable reluctance motor, with the powered electromagnets distributed along a track in a track bound application such as would be used by a train. I have found that the system proposed in US2008/0303355, applied for by Fiske, utilizes a large number of electromagnets per distance traveled, requires a large number of switches, a large number of control systems, and does not have sufficient power to propel a vehicle over the wide range of load demands.

U.S. patent application US2008/0303355, applied for by Fiske, recites the concepts of a switched variable reluctance motor, with the powered electromagnets distributed along a track in a track bound application such as would be used by a train. I have found that the system proposed in US2008/0303355, applied for by Fiske, utilizes a large number of electromagnets per distance traveled, requires a large number of switches, a large number of control systems, and does not have sufficient power to propel a vehicle over the wide range of load demands. US2008/0303355, applied for by Fiske, also constrains the ferromagnetic material used in the rolling rotor of a variable reluctance motor, to be rigid and only rotate about a central axis (train wheel).

US2016/0329803, applied for by Burigo, and WO 2015/118416 by Navis, addresses scenarios where the ferromagnetic material, which is part of the rolling rotor, only rotates about a central axis in a rigid manner, or where the ferromagnetic material is attached to rigid spoke like structures which are attached to the central axis and which spokes rotate about the central axis, but the ferromagnetic material is attached at the other end of the rigid spoke and is allowed to rotate about the end of the rigid spoke but not translate.

Neither US2008/0303355, applied for by Fiske, or US2016/0329803, applied for by Burigo, or WO 2015/118416 by Navis, provide any new method or means for implementing variable reluctance motors in high peak load, large scale transportation systems where a vehicle may need to travel on arbitrary, open ended courses extending from kilometers to thousands of kilometers, and requiring propulsive power ranging from tens of horsepower to several hundred horsepower.

The prior art fails to address the practical issue of using variable reluctance motors to meet the propulsive power requirements for common large scale transportation systems. I have found that for practical large scale transportation systems, the peak power required for acceleration and other high load scenarios, would make the required electromagnet size (pole cross section, number of coil windings, etc) too large to simply integrate the system into typical vehicles. The number of electromagnets required and/or the size of each electromagnet would make the system non-competitive with fossil fuel powered vehicles and traditional battery powered electric vehicles. Additionally, it is impractical to provide powered electromagnets in all possible arbitrary and open-ended courses a typical vehicle may take at any given time. The prior art also fails to identify methods and design features of the variable reluctance motor system which can be introduced to reduce the cost of electromagnet hardware, switching circuits and control systems to the point where variable reluctance systems can be cost competitive for high power applications and on a broad scale.

SUMMARY

In accordance with one embodiment, a hybrid variable reluctance motor (VRM) propulsion system comprises a vehicle with: an on-board engine, specialized partially ferromagnetic converters (wheels), on-board VRM control systems, electromagnet arrays embedded in portions of a roadway (path), and vehicle control systems which allow the vehicle operator to selectively determine the amount of propulsive energy that comes from the on-board engine and the amount that comes from the VRM system.

Advantages

One embodiment of the proposed technology is a variable reluctance motor hybrid vehicle propulsion system which may function as a primary, supplemental, or periodic propulsion system for various roadway vehicles, in conjunction with an on-board propulsion source. This propulsion system utilizes in-roadway electricity to power vehicles. For typical highway applications, the in-roadway electricity may be provided by the utility company or by individual power suppliers (example: individuals or businesses with solar panel installations). This propulsion system has many advantages over previous in-roadway propulsion systems; the main advantages being the flexibility to use the system in conjunction with other propulsion sources such as internal combustion engines or battery powered motors. An advantage of this embodiment is that the size of the electromagnets, number of control systems, number of switches can be minimized providing a substantially cost competitive propulsion system.

Another advantage of an embodiment of hybrid VRM vehicle propulsion power, is that it may enable smart grid technologies that will allow utilities to better balance the load on the grid by using the in-roadway system as an adjustable output. This can be done by controlling the number of vehicles using the in-roadway power or controlling the amount of in-roadway power used by each vehicle. Since the vehicles will not be solely dependent on the in-roadway power, this adjustment will be seamless to the users of the vehicles. Additionally the in-roadway power system can be used to generate power from vehicles either during a regenerative breaking event, or during normal operation. This creates a potentially large economic opportunity for the utility company to balance electrical grid load and supply. It is also a large economic opportunity for the users of the in-roadway power system to become suppliers (or deferrers) of electricity. This embodiment is also an enabling technology for renewable power sources, either at the individual or utility scale, that may have periodic output since the in-roadway system can be energized when the renewable sources are available, but the renewable sources are not required to continue travel by typical methods.

Another primary advantage is that this technology can be integrated into the existing fleet of vehicles and does not require exclusive dedicated lanes, or right-of-way, thus the roadways may be used with all types of vehicles. These considerations offer a practical way of introducing the technology into the existing fleet of vehicles without requiring all vehicles to adopt the technology. It can be phased in mile-by-mile and lane by lane as demand justifies the implementation of the system.

These and other benefits of one or more aspects will become apparent from consideration of the ensuing description and accompanying drawings.

DRAWINGS—FIGURES

FIG. 4A shows a push-button type switch used as a sensor used in the path side of the hybrid VRM system.

FIG. 5 shows a side view of one embodiment of a converter assembly (appears as a typical wheel).

FIG. 5A shows a front view of one embodiment of a converter assembly (appears as a typical wheel).

FIG. 5B shows a cross-section view of the converter assembly taken from FIG. 5. This converter assembly uses flexible ferromagnetic material in the tire.

FIG. 5C shows a cross-section view of the converter assembly taken from FIG. 5A. This converter assembly uses flexible ferromagnetic material in the tire.

DRAWINGS—REFERENCE NUMERALS

Figure 1:
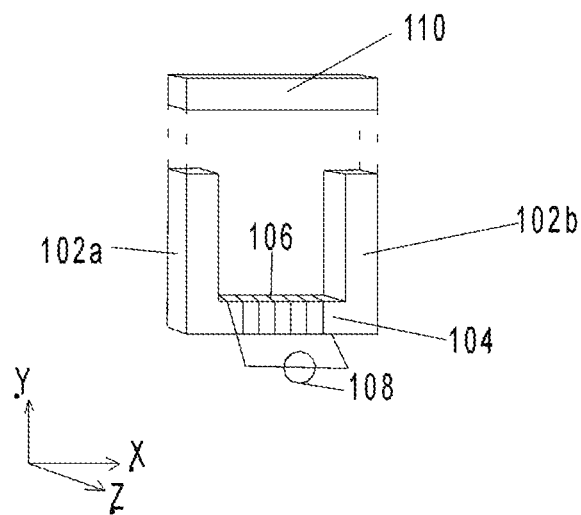
FIG. 1 (prior art) shows various aspects of the well-known "u-shaped" electromagnet FIG. 2 (prior art) shows various aspects of the well-known magnetic circuit representation of the "u-shaped" electromagnetic described in FIG. 1.
Figure 2:
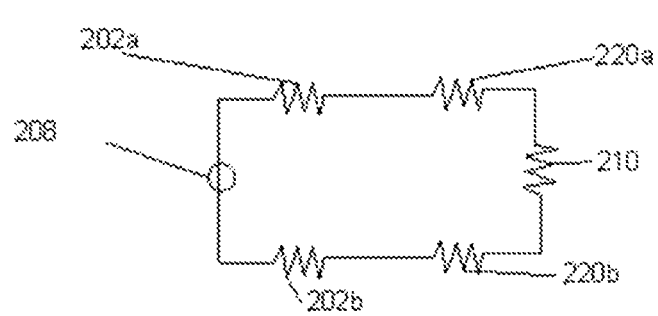

102a Pole leg "a"
102b Pole leg "b"
104 Yoke
106 Coil
108 Electric current source
110 Armature
202a Reluctance of pole leg "a" and half of the yoke
202b Reluctance of pole leg "b" and half of the yoke
208 Magnetic flux source
210 Armature reluctance
220a Air gap "a" reluctance
220b Air gap "b" reluctance
300 Vehicle
302 Path
304a "in-bound" side electromagnet "a"
304b "In-bound" side electromagnet "b"
304c "in-bound" side electromagnet "c"
304d "Interacting" electromagnet "d"

Figure 3:
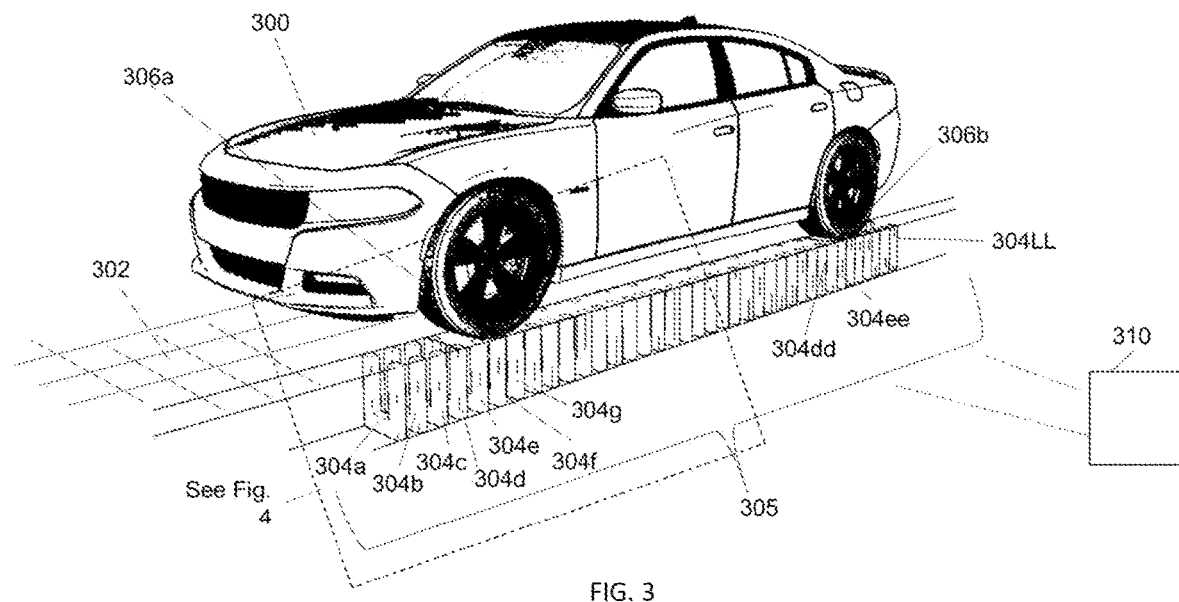
FIG. 3 shows a transverse flux embodiment of the hybrid variable reluctance motor (VRM) system.
Figure 4:
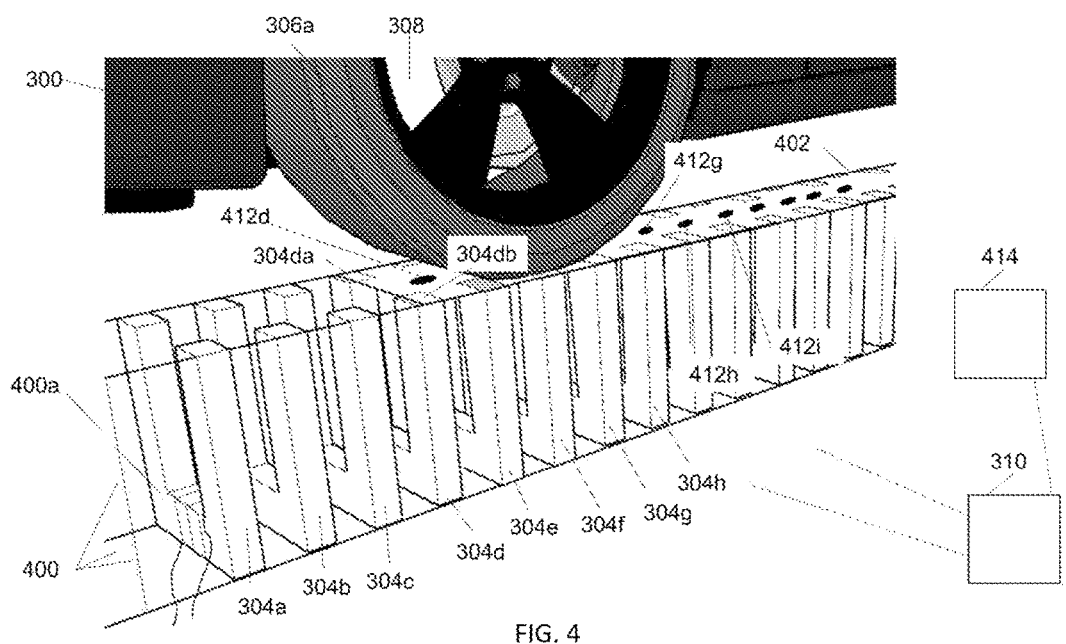
FIG. 4 shows a detailed view, in the region of the front converter assembly (appears as the driver's side wheel), of the transverse flux embodiment of the hybrid VRM system described in FIG. 3.

304e "Interacting" electromagnet "e"
304f "Turned off" electromagnet "f"
304g "Outbound side" electromagnet "g"
304h "Outbound side" electromagnet "h"
304da Pole face "a" of pole "d"
304db Pole face "b" of pole "d"
304dd "Interacting" rear electromagnet "dd"
304ee "Interacting" rear electromagnet "ee"
304LL Last shown electromagnet "LL"
305 Electromagnetic stator array
305a Stator array segment "a"
305b Stator array segment "b"
305c Stator array segment "c"
306a Front driver's side converter
306b Rear driver's side converter
308 Hub
310 Stator control system
400 Channel
400a Electric coil
402 Cover
412a Push-button position sensor "a"
412b Push-button position sensor "b"
412c Push-button position sensor "c"
412d Push-button position sensor "d"
412e Push-button position sensor "e"
412f Push-button position sensor "f"
412g Push-button position sensor "g"
412h Push-button position sensor "h"
412i Push-button position sensor "i"
412LL Push-button position sensor "LL"
413 Movable index of the push button sensor 412d
414 Electric grid data system
510 Tire
512a Conformable ferromagnetic belt "a"
512b Conformable ferromagnetic belt "b"
516 Conformable ferromagnetic belt bridge
514a Spacer "a"
514b Spacer "b"
530 Rim
601 Point on path segment
612 Point on path segment
613 Point on path segment
614 Point on path segment
620 Path segment
625 Point on path segment
630 Path segment
640 Path segment
650 Path segment
656 Point on path segment
657 Point on path segment
700 First logic flow point
810 Representation of the on-board vehicle control system
812 On-board VRM control system
814 Typical vehicle operator control features
816 Vehicle operator input
900 Vehicle used on longitudinal flux embodiment
902 Path used on longitudinal flux embodiment
904a Pole "a" for longitudinal flux embodiment
904b Pole "b" for longitudinal flux embodiment
904c Pole "c" for longitudinal flux embodiment
904d Pole "d" for longitudinal flux embodiment
904e Pole "e" for longitudinal flux embodiment
904f Pole "f" for longitudinal flux embodiment
904g Pole "g" for longitudinal flux embodiment
905 Comb type stator
905a Comb type stator "a" for embodiment with multiple stators in single channel
905b Comb type stator "b" for embodiment with multiple stators in single channel
906a Front driver's side converter longitudinal flux embodiment
906b Rear driver's side converter longitudinal flux embodiment
908d Coil "d" for longitudinal flux embodiment
1002 Cover for longitudinal flux embodiment
1110 Inflatable tire for longitudinal flux embodiment
1112 Conformable ferromagnetic belt for longitudinal flux embodiment
1114a Spacer
1114b Spacer
1202 Inside removable ferromagnetic rim
1204 Outside removable ferromagnetic rim
1206 Low reluctance ferromagnetic bridge
1302 Removable rigid ferromagnetic segments
1304 Very low profile tire
1402 Removable rigid ferromagnetic segments
1412a Conformable ferromagnetic belt "a"
1412b Conformable ferromagnetic belt "b"
1414a Vertical ferromagnetic connector "a"
1414b Vertical ferromagnetic connector "b"
1416a Spacer
1416b Spacer Detailed Description—FIGS. 3, 4, and 4a—First Embodiment FIG. 3 shows a perspective view of one embodiment of the hybrid variable reluctance motor (VRM) propulsion system. This embodiment is a transverse magnetic flux VRM configuration. A vehicle 300 travels along a road, highway, or path 302. The vehicle 300 is a well-known automobile with an on-board internal combustion engine, powertrain, operator interfaces, and control systems. The vehicle 300 is also able to utilize the VRM system through two specialized wheels denoted as converter 306a and converter 306b, and an on-board VRM control system (not shown). The converters 306a and 306b are connected to the vehicle 300 as typical wheels. In this embodiment, converters are only positioned on the driver's side of vehicle 300. Other embodiments may use different converter arrangements, where a converter replaces one or more of the vehicle's wheels. Other embodiments may use other on-board sources for propulsive power such as battery powered electric motors, etc. The vehicle 300 in this embodiment is shown as a car, but other properly equipped vehicles such as trucks, vans, buses, tractor-trailers, etc., may be used on the hybrid VRM system.

FIG. 3 also shows many of the path side components of the hybrid VRM system. An array of well-known, two pole "u-shaped" electromagnets 304a through 304LL are incorporated into the path 302. The array of electromagnets 304a through 304LL, is denoted as the electromagnetic stator array 305. Only a portion of the stator array 305 is shown in FIG. 3, as the number of electromagnets may extend indefinitely in either direction along the path 302. For clarity, only a selected number of electromagnets are labeled. Multiple stator arrays may be positioned either continuously or discontinuously along the length of any path. Other embodiments may use multiple stator arrays arranged across the width of the path (i.e., stator arrays aligning with both the driver's side wheels and the passenger's side wheels). The electromagnets in stator arrays 305 are shown without electric coils or electric connections for clarity. A stator control system 310 is connected to each electromagnet in the stator array 305. The on-board VRM control system (not shown) is wirelessly connected to the stator control system 310. In other embodiments one stator control system may be used to control an entire stator array, a portion of a stator array, or multiple stator arrays along the path 302.

As shown in FIG. 4, the converter 306a interfaces with a cover 402 through rolling contact. The converter 306b (not shown in FIG. 4) also interfaces with the cover 402 through rolling contact. The top surface of the cover 402 sits flush, or nearly flush, with the top surface of the path 302. The cover 402 forms a portion of the path 302. Other embodiments may position the cover 402 so that the top surface is above or below the top surface of the path 302. The cover 402 is made of aluminum plate with openings to allow for each electromagnet pole face to sit approximately flush with the top surface of the cover 402. Other embodiments may position the electromagnet pole faces above or below the top surface of the cover 402. Other embodiments may use a cover 402 without openings for the electromagnet poles, and position the electromagnets so that the pole faces interface with, or are below, the bottom surface of the cover 402. Other embodiments may attach ferromagnetic pole extensions into holes in the cover 402. These extensions sit approximately flush with the top of the cover 402, and then the electromagnets are positioned so that the pole faces interface with the bottom surface of the pole extensions. Other embodiments may use other non-ferromagnetic material for the cover 402, such as non-magnetic stainless steels, polymers, reinforced concrete, etc.

The electromagnets 304a through 304LL are individually attached to a channel 400, using bolts which are connected thru flanges on the electromagnets (not shown) into threaded inserts in the channel 400 (not shown). Other embodiments may use other electromagnet to channel 400 connections, such as welds, clamps, press-fit, etc. The channel 400 is anchored to the subgrade of the path 302 using typical concrete footings and bolted connections. Other embodiments may use other connections between the channel 400 and the subgrade, such as pilings, friction, flanges, etc. The cover 402 is attached to the channel 400 using bolts which connect through holes in the cover into threaded inserts in the channel 400 (not shown). The channel 400 is made of concrete reinforced with fiberglass. Other embodiments may use other non-magnetic materials for the channel 400 such as non-magnetic steels, aluminum, polymers, etc. Other embodiments may use other attach features, such as clamps, press fit, slide lock tongue-and-groove features, etc., between the cover 402 and the channel 400.

FIG. 4A shows a push-button position sensor 412d, where the top surface of the movable index 413 protrudes slightly above the cover 402. The same configuration is used for the other position sensors which are positioned between each electromagnet in the stator array 305. FIG. 4 shows a simplified representation of some of the position sensors, 412d through 412i, that are attached to the cover 402. All of the position sensors are not shown. Other embodiments may use more or less sensors, or different instruments for detecting position, such as strain gages mounted on the inside of the cover 402, photodiodes mounted nearly flush with the top surface of the cover 402, pressure switches integrated into each electromagnet mount, measurement of the changing inductance in the electromagnets as the converters 306a and 306b interact with the electromagnets, or other methods for signaling the position of the converters 306a and 306b relative to the electromagnets.

The orientation of the electromagnets is shown in FIG. 4. Electromagnet 304d is arranged such that the line connecting the center of the pole faces 304da and 304db, is approximately transverse to the direction of vehicle travel, this is denoted as the transverse direction. The same orientation is used for the other electromagnets in the stator 305. The direction of travel of the vehicle 300, is the longitudinal direction. The normal direction is the normal vector pointing out from the surface of the cover 402. At any point on the surface of the cover 402 these directions, transverse, longitudinal, and normal define an orthogonal coordinate system.

The electromagnets 304a through 304LL are constructed using well known materials, processes, and design features. The electric coils used on each electromagnet are made using insulated electrically conductive wire well known in the art. An electric coil 400a is shown on the electromagnet 304a, with only a small number of turns for clarity. The coil 400a is shown wrapped around the yoke portion of the electromagnet in this embodiment. However, in other embodiments the coil 400a may be wrapped around either pole leg, or any combination of pole legs and yoke. Other embodiments may use multiple independently controlled coils on each electromagnet. For this embodiment, the coil 400a is made of AWG18 copper wire with a varnish insulator typically used for electromagnets. The coil 400a consists of approximately 3000 turns around the yoke. The coil 400a may also be fabricated from other materials such as aluminum, aluminum with a copper sheathing, etc. and use other wire insulator materials. For other embodiments, the coil 400a may be fabricated with different wire gages (cross-sectional areas), and use a different number of turns, and may vary for individual electromagnets in the same system. The coils 400a through 400LL (not shown) are connected to the stator control system 310. The stator control system 310 is connected to a direct current (DC) electric power source (not shown). However, other embodiments may use an alternating current (AC) electric power source to supply the stator control system 310 and/or the electromagnets, or an AC power source to supply the stator control system 310, which then converts the AC source to DC, using well known methods to supply the electromagnets.

An electric grid data system 414, is connected through a wired or wireless connection to the stator control system 310, and wirelessly to the on-board VRM control system.

In FIG. 3 and FIG. 4 the electromagnets 304a through 304LL have two substantially vertical pole legs, with the pole faces substantially in the horizontal orientation, and a yoke connecting the pole legs. For other embodiments the pole legs may be angled relative to the longitudinal-normal plane, and/or the transverse-normal plane, and the pole faces may be angled relative to the longitudinal-transverse plane. The angle of the pole legs may also vary for each pole of an electromagnet, or each electromagnet in an array may use different angular orientations.

The electromagnets in stator array 305 are spaced at an approximate longitudinal distance of 20 cm (8 inches). However, the stator array 305 can have electromagnets spaced at different longitudinal distances based on application, terrain, expected load, typical vehicle type, etc. and may vary within the stator array 305. The pole face spacing, measured in the transverse direction from the outside edge of one pole face to the outside edge of the other pole face, is approximately 20 cm (8 inches). However, the pole spacing may be different for different applications and different regions of the path depending on expected load. The embodiment of FIG. 4 has electromagnets with each pole face being of approximately equal area. Each pole face is rectangular, with approximate dimensions of 2.54 cm (1 inch) in the transverse direction, and 10.16 cm (4 inches) in the longitudinal direction. The pole leg cross-sectional area in the transverse-longitudinal plane is approximately constant along each pole leg, and in the transverse-normal plane along the yoke of the electromagnet. However, for other embodiments the pole face geometry, pole leg cross-section, and yoke cross-section may be different from pole leg to pole leg, pole leg to yoke, or electromagnet to electromagnet. In other embodiments, the electromagnet core cross-sections may also have different shapes such as circular, oval, triangular, polygonal, irregular and the cross-sectional shape may vary along the pole legs and across the yoke of the electromagnet. In this embodiment each pole leg is approximately 20.32 cm (8 inches) long in the vertical direction. However, the pole leg length may be different based on the embodiment, application, region of the path, or expected load. The electromagnets shown in FIG. 3 and FIG. 4 are arranged in an approximate linear fashion. However, the electromagnets may be arranged along any path that is any arbitrary combination of approximately straight lines and curves provided the radius of any portion of a curved path is greater than approximately 12 m (40 feet) to maintain sufficient engagement of the converters 306a and 306b with the stator array 305.

Detailed Description FIGS. 5, 5', 5a, 5b, 5c

FIG. 5 is a front view of converter 306a, showing the rim 530 and the tire 510 with section line references for FIG. 5B. FIG. 5A is a side view of the converter 306a, showing the tire 510 with the section line references for FIG. 5C. FIG. 5B is a cross-sectional view of the converter 306a. In FIG. 5B the vehicle hub 308 is attached to the rim 530, and a well-known inflatable tire 510 is attached to the rim 530 using methods well-known in the art. Other embodiments may include an active pressurization system, which is able to adjust the internal pressure of the tire based on operational requirements. Three conformable ferromagnetic belts 512a, 516, 512b, are positioned around the inside diameter of the tire 510 tread region. The distance between the center of belt 512a and the center of belt 512b in the transverse direction, is approximately 18 cm (7 inches). A spacer 514a is positioned between belt 512a and the inner sidewall of the tire 510. A spacer 514b is positioned between belt 512b and the outer sidewall of the tire 510. The spacers 514a and 514b do not need to contain ferromagnetic material, and in this embodiment are rubber. The spacers 514a and 514b are bonded to the sidewalls and to the inside of the tread region of tire 510. The belt 512a is bonded to the spacer 514a and the inside diameter of the tread region of the tire 510. The belt 512b is bonded to the spacer 514b and the inside diameter of the tread region of the tire 510. The belt 516 is bonded to belt 512a and belt 512b and to the inside of the tread region of the tire 510. All bonds between, belts, spacers and tire are made with a flexible adhesive. Other embodiments may include additional structural reinforcement in the tread region and/or sidewalls of the tire 510, in excess of the typical amount, to provide sufficient structural capability to resist the centripetal force resulting from the high speed rotation of the belts 512a, 512b and 516, and the VRM loads. For other embodiments the spacer dimensions will vary depending on the width of any specific tire, which may be different for different vehicles. The spacers 514a and 514b allow for the ferromagnetic converter assembly to be used in various tire configurations and widths.

FIG. 5C is a cross-section view of converter 306a through the ferromagnetic belt 512b. The tire 510 and belt 512b deform to a substantially flat condition in the region of contact with the path 302 or cover 402. In this embodiment, the belt 512b is made by spirally wrapping approximately 75 revolutions of a single piece of approximately 0.5 mm (0.02°) thick by approximately 12.7 mm (0.5") wide rectangular cross-section silicon iron strip to produce a ferromagnetic belt that is approximately 38.1 mm (1.5") thick in the radial direction and 12.7 mm (0.5") wide in the transverse direction and has an outside radius approximately equal to inside diameter of the tread region tire 510. The spiral wrapped ferromagnetic belt uses 25 mm (1") wide, 1.27 mm (0.05") thick steel straps are positioned around the spiral wrapped belt every 30-degrees to maintain coiling. The spiral wrapped belt is encased in rubber (not shown). Belt 512a and belt 516 are made in a similar manner. Other embodiments that use a spiral wrapped belts may utilize different strip thicknesses, different total number of wraps, multiple lengths of iron strip that are connected together, multiple lengths of iron strip that are not connected, different total thickness, different methods to maintain coiling, etc.

Spiral wrapped conformable belts are used in this embodiment, but there are many other methods for producing conformable ferromagnetic belts including: stacking multiple concentric rings of thin ferromagnetic material; spiral wrapped or layered ferromagnetic wire or wire rope; spiral wrapped or layered ferromagnetic wire mesh or woven wire cloth; ferromagnetic particles, strips, rods, bars, etc. interspersed in a flexible binder; a single piece ferromagnetic ring with a sufficient number and depth of transverse direction grooves on the inside diameter, and/or outside diameter of the ring; and many other ferromagnetic belt designs which provide sufficient flexibility to conform similar to the tire 510 as it rolls along a surface.

The belts 512a, 516, and 512b described in this embodiment are secondarily bonded to the inner surfaces of the tire. Other embodiments may include conformable ferromagnetic belts as an integral part of the tire 510, and may utilize common reinforcing plies in the tire 510 as part of the conformable ferromagnetic belts. The locations of ferromagnetic material shown in this embodiment illustrate only some of possible locations, configurations, and orientations. This embodiment is shown for a typical automobile tire/rim assembly with an inflatable tire. However, the similar features can be used on solid or non-pressurized tires.

Figure 6:
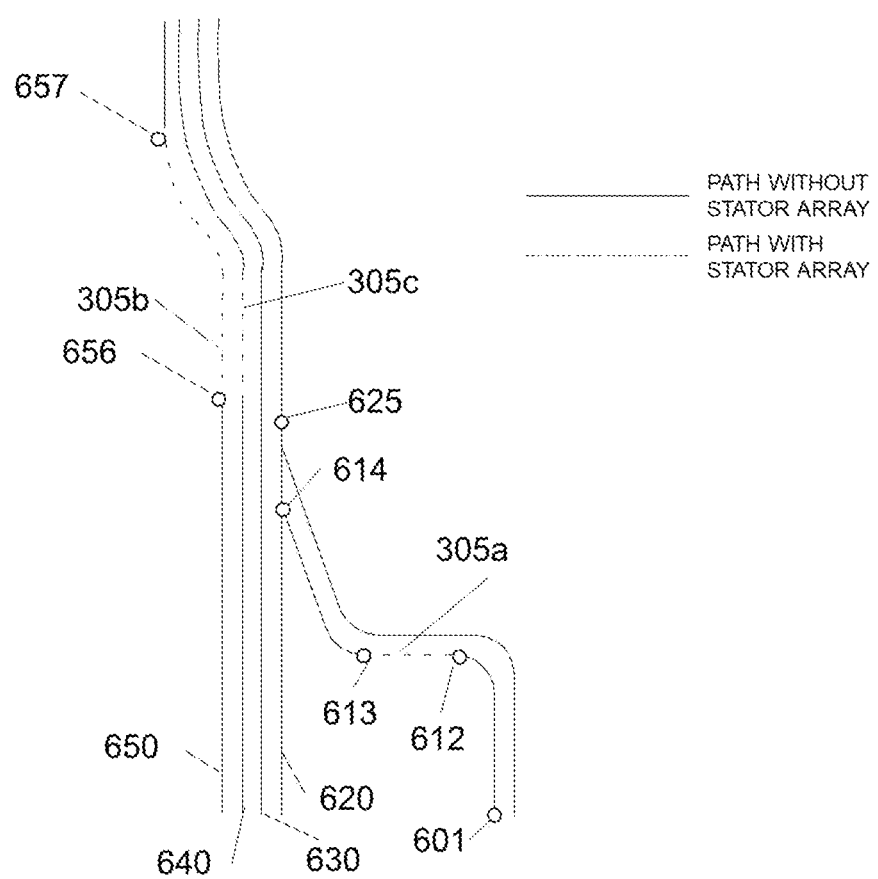
FIG. 6 shows a schematic representation of one embodiment of an arbitrary system of paths and hybrid VRM stator array segments that could be used by a properly equipped vehicle to travel.
Figure 7:
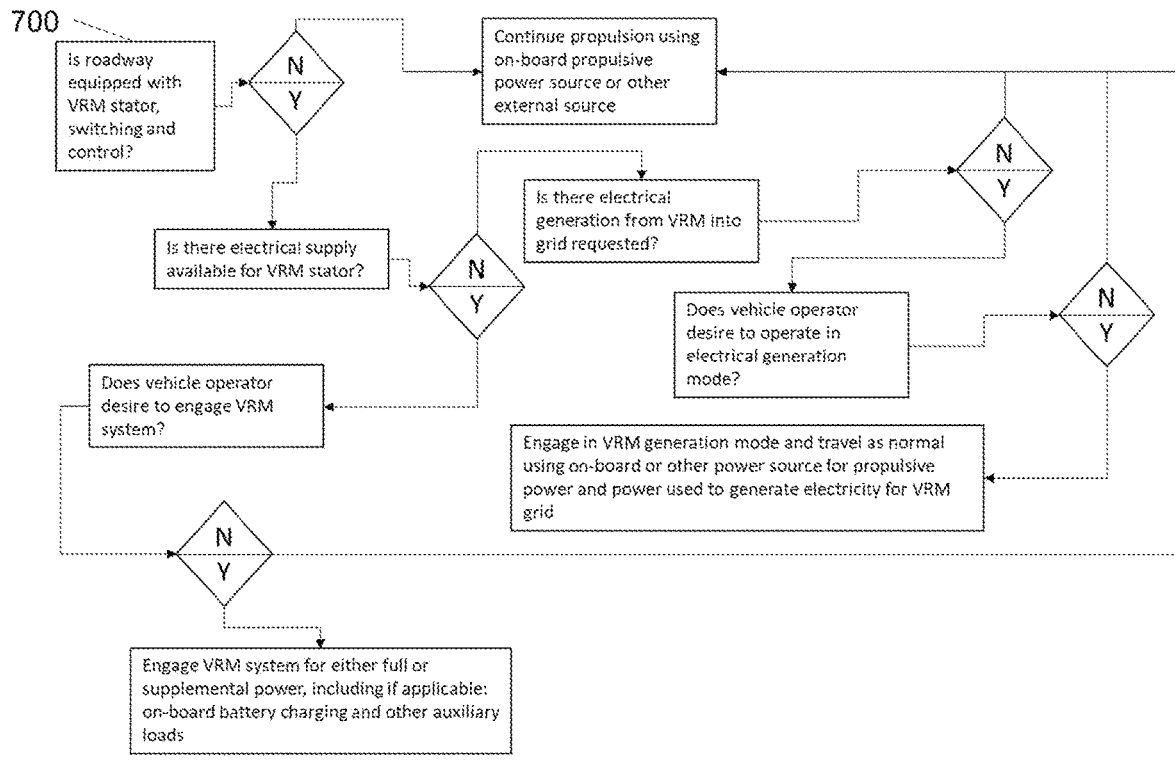
FIG. 7 shows a logic flow diagram for one embodiment of a vehicle that is operating on a system of paths that includes at least one hybrid VRM stator array.
Figure 8:
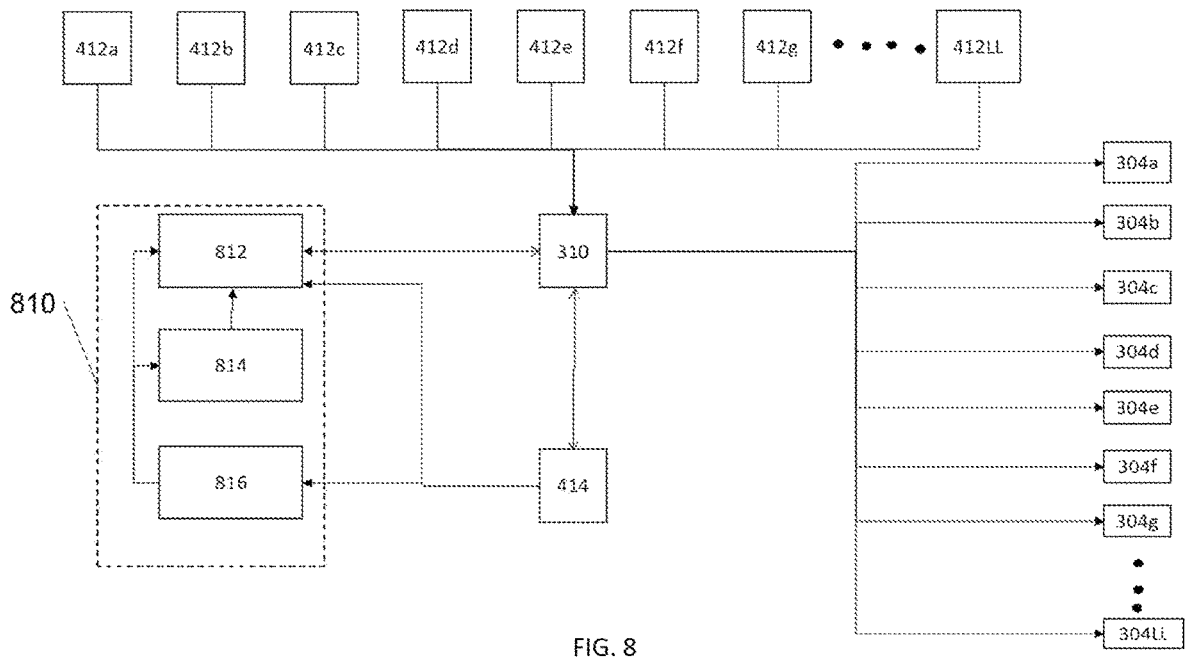
FIG. 8 shows simple block diagram showing how information or signals flow between components of one embodiment of a hybrid VRM system.

Detailed Description FIGS. 6, 7, 8

A simplified schematic representation of a portion of a hypothetical, and arbitrary, vehicle pathway system is shown in FIG. 6. Here path 302 consists of multiple path segments. The first path segment extends from point 601 to point 612 as a typical roadway without any stator array. From point 612 to point 613 a stator array 305a is present. From point 613 to point 614 the path does not have a stator array. At point 614, the path connects to an increased number of potential pathways. Path segment 620 and path segment 630 extend as typical pathways without stator arrays. Path segment 640 incorporates a stator array 305c along a portion of the length. Path segment 650 incorporates a stator array 305b beginning at point 656, and ending at point 657. The schematic shown for this embodiment is illustrative only, the locations of stator array sections is arbitrary and may be positioned at any suitable location in any path. The pathways shown in this embodiment may represent tens, hundreds, or thousands of kilometers.

FIG. 7 is a logic flow diagram for a vehicle 300 traveling on a path. The logic flow diagram shows the logic gates for the vehicle operator and stator control system 310.

FIG. 8 is a simple block diagram showing how information or signals flow between components of the hybrid VRM system.

Operation FIGS. 3 and 4

Prior to the state shown in FIGS. 3 and 4, where the vehicle 300 is being propelled by the hybrid VRM system, the vehicle 300 used the on-board engine and powertrain to accelerate from a low speed or stopped condition, to cruising speed. At the instant in time, time=t1, shown in FIG. 3 and FIG. 4, the hybrid VRM system is providing full propulsive power to the vehicle 300 through the stator array 305, and converters 306a and 306b.

To describe the operation of the hybrid VRM system an arbitrary scenario is considered. Assume that the vehicle 300 is traveling at a constant velocity of 31 m/s (70 mph). To maintain this velocity, a force in the approximate range of 400 N (90 lbf) to 800 N (180 lbf) must be applied to the vehicle 300 in the direction of travel. This velocity and range of forces equates to approximately 12.4 kW (16.6 hp) to 24.8 kW (33.2 hp) of propulsive power in the direction of travel. I currently estimate that approximately 30% of the electric power supplied to the hybrid VRM system will be converted to propulsive power (e_f=30%). Using this efficiency factor gives an approximate required electrical supply power of 41.33 kW to 82.67 kW. This required electric power is applied only to the electromagnets in the stator array 305 which are currently powering the vehicle 300. The efficiency factor may vary for different regions, loads, and embodiments. In this embodiment, the vehicle 300 has two converters 306a and 306b engaged with the stator array 305, and the VRM system is designed so that two electromagnets in the stator array 305 are interacting with each converter at any time. At the instant in time shown in FIG. 3 four electromagnets, 304d, 304e, 304dd, 304ee are propelling the vehicle. This gives the approximate average required electric power at each electromagnet that interacts with converter 306a or 306b, at 10.33 kW to 20.67 kW. The velocity and power requirements used in this example are arbitrary, the hybrid VRM system could be used to propel the vehicle 300 at any typical vehicle velocity over various terrain and through various environmental conditions. For other embodiments that have different wheel diameters, vehicle loads, environments, efficiency factors, etc. the required electromagnet power will differ.

The on-board internal combustion engine of the vehicle 300 uses a typical fuel injection system. The fuel injection system is able to reduce or stop the flow of fuel to the engine when the vehicle 300 is operating under propulsive power provided by the stator array 305. This is similar to the typical operation of a fuel injection system when a vehicle is coasting down a hill. In these no-load conditions, the engine is "on", but not consuming a significant amount of fuel. Having the on-board engine "on" at all times allows for the vehicle operator to accelerate and adapt to changing loads, using the on-board engine, even when the vehicle 300 is being propelled by the hybrid VRM system.

At the instant in time captured in FIG. 4, denoted as time=t1, the central axis of rotation of the converter 306a is approximately centered over electromagnet 304f, and the electromagnets 304a, 304b, 304c. 304d and 304e are powered. Each of the electromagnets 304a, 304b, 304c, 304d and 304e has been powered for a different amount of time prior to time=t1. The magnetic fields produced by electromagnets 304d and 304e interact with the ferromagnetic material in converter 306a, thereby producing attractive forces that tend to reduce the air gap between converter 306a, and electromagnets 304d and 304e. The magnetic forces that tend to reduce the air gap, cause the converter 306a to rotate in the counterclockwise direction (when viewed looking from the driver's side looking toward passenger's side). Through friction, the path 302 reacts force from the rotation of converter 306a, resulting in a translation of the vehicle 300 along the path 302. The electromagnets 304d and 304e also impose a direct component of force in the direction of travel, on the converter 306a, which also contributes to the propulsion of the vehicle 300.

At time=t1, the magnetic fields from electromagnet 304a, 304b, and 304c do not significantly interact with the converter 306a, but energy is stored in the magnetic fields. A portion of the stored magnetic field energy will contribute to the vehicle propulsive force when the converter 306a reaches the appropriate position. At time=t1, electromagnet 304a, 304b, and 304c are denoted as pre-powered electromagnets. In this embodiment, three electromagnets are pre-powered, in other embodiments or in other regions of the path 302, the number of pre-powered electromagnets may vary.

The electromagnets 304f, 304g are still in the general region of the converter 306a, but are turned off because they are on the outbound side of the converter 306a. There is no significant magnetic interaction occurring between the electromagnets 304f, 304g and the converter 306a, only a small amount due to residual magnetic fields in the electromagnets. Reversing the sign of the electric current in the electromagnets 304f, 304g may be used in some embodiments to minimize the residual attractive force between the outbound side electromagnets and the converter 306a.

As the converter 306a and converter 306b roll over any push switch (see 412d for example), the movable index 413 in FIG. 4A is slightly depressed and a signal is sent to the stator control system 310 through a wired connection. The push switches (412 for example) provide signals for the stator control system 310 to estimate the position and velocity of the converters 306a and 306b.

At a later time, denoted as time=t2 (not shown), vehicle 300 will have traveled along the path, to a position on the stator array 305 where the air gap between electromagnet 304e and the converter 306a has just closed. At approximately time=t2, electromagnet 304e will be turned off. Other embodiments may turn off an electromagnet prior to air gap closure or sometime after air gap closure. Electromagnet 304d remains energized at time=t2, with the magnetic field from 304d continuing to interact with the ferromagnetic material in converter 306a, thereby exerting forces on 306a that tend to close the gap between the converter and electromagnet 304d. Approximately at time=t2, electromagnet 304c will begin to interact more significantly with the ferromagnetic material in converter 306a, and thereby contribute to the propulsive power for vehicle 300. Also approximately at time=t2, the next electromagnet on the inbound side of the stator (not shown) will be pre-powered and begin storing energy in its magnetic field. This process of sequentially powering and turning off electromagnets continues in time as the vehicle 300 travels along the path. The timing and magnitude of the power supplied to each electromagnet, may vary based on: input from the operator of vehicle 300 through the on-board VRM control system, input from the grid control system 414, and signals from the ground based stator control system 310. The timing and magnitude of the power supplied to each electromagnet may also vary for other embodiments where the vehicle load is different or the diameter of the converter is different. The same process is used to produce propulsive power through converter 306b (rear driver's side of vehicle 300) and the electromagnets that are local to converter 306b at any given time. While the stator control system 310 is shown notionally as one unit, multiple stator control systems may be used to control different stator arrays or stator array regions.

The channel 400 and the cover 402 shown in FIG. 4, provide environmental protection to the electromagnets, structural stability to the stator array, access for thermal management systems, and a wiring conduit. The channel 400 provides sufficient restraint to the electromagnets so that movement of the electromagnets is minimized during VRM operation.

No other vehicle is shown traveling on the portion of stator array 305 that is shown in FIG. 3, but other vehicles could be traveling on stator array 305 without adversely affecting the operation of the vehicle 300.

The total electrical budget for each vehicle operating, or desiring to operate, on stator array 305 is provided to the stator control system 310, and the on-board VRM control system, by the grid control system 414. The grid control system 414 receives, traffic, weather, total electric grid load, and other information from a network of sensors and inputs and provides a total electrical budget for operating a portion of the hybrid VRM system. Since the vehicle 300 is equipped with an on-board propulsive power source, with an independent control system, the hybrid VRM system need not provide complete propulsive power. If the operator of the vehicle 300 desires more power than is available from the VRM system, then the on-board propulsive system is engaged through typical means to provide the balance of the desired propulsive power.

The hybrid VRM system is also capable of operating in generation mode. In generation mode the mechanical work produced by the on-board engine of vehicle 300, is converted to electrical energy using the converters 306a and 306b as they interact with the stator array 305. If vehicle 300 were operating in generation mode, rather than propulsion mode, at time=t1 shown in FIG. 4, then the electromagnets 304g and 304h are energized, and electromagnets 304a, 304b, 304c, 304d, 304e, and 304f are switched off. Since 304g and 304h are energized and the converter assembly is being rotated by the on-board propulsion system, the ferromagnetic material in converter 306a is moved away from the electromagnets, increasing the magnetic reluctance of the system. As the reluctance is increased, energy is stored in the magnetic field. Using an appropriate switching arrangement, some of the stored magnetic field energy can be converted into electricity to charge the electrical grid. The same process is used at converter 306b with the electromagnets that are local to converter 306b at any given time. Generation mode can also be used for regenerative braking. The timing and power level of the electromagnets used for generation is controlled by the stator control system 310.

Operation FIG. 5C

The cross-section FIG. 5C, is taken through the ferromagnetic conformable belt 512b. As shown in FIG. 5C the belt 512b conforms to substantially flat condition over the region where the tire 510 contacts the path 302. For this embodiment the ferromagnetic material used in the converter 306a, which comes in the form of belts 512b, 516, and 512a not only rotate about the central axis of the converter 306a, but also translate radially to conform to the path. The same rotation and translation occurs in all of the ferromagnetic belts in converter 306a and converter 306b.

Other embodiments may also use completely different format for the ferromagnetic conformable belts. The main features of any ferromagnetic conformable belt are: ferromagnetic material in sufficient quantity to form a low reluctance magnetic flux path, sufficient attachment to the tire so that loads from the magnetic field can be transferred to the tire, flexibility to conform with the tire, sufficient fatigue resistance to last the useful life of the tire, and structural reinforcement sufficient to tolerate the centripetal load from the rotating wheel.

Operation FIG. 6

To aid in describing the operation of the hybrid VRM system, FIG. 6 provides a simplified schematic type representation of an arbitrary set of path segments that the vehicle 300 could travel. This will help describe how the vehicle may be propelled by the on-board engine, the VRM system, or a combination of both. In FIG. 6 the vehicle 300 begins travel at arbitrary point 601 on a path segment. While traveling from point 601 to point 612 the vehicle is propelled by on-board propulsive power (internal combustion, battery electric, etc.). At point 612 the vehicle 300 may begin using the hybrid VRM system by engaging stator array 305a for full, or supplemental, propulsive power. The potential for full or supplemental power from the VRM continues until point 613, where the VRM stator assembly 305a ends. Without stopping or slowing down at point 613, the vehicle returns to full propulsive power being provided by the on-board engine and continues under on-board power through point 614. At point 614 vehicle 300 merges onto path segment 620 and travels for a distance and then changes lanes from path segment 620 to path segment 650 (without necessarily slowing down or stopping). Entering path 650 after point 656, at an intermediate point on the stator array 305b. The vehicle 300, engages the stator array 305b and travels under stator supplied power until point 657. At point 657 the vehicle 300 resumes on-board propulsive power, without stopping or slowing down, and travels in any lane necessary.

While traveling under the power of any of the stator arrays, the vehicle 300, can accelerate using a stator array for propulsive power or by using the on-board engine, or a combination of both. Vehicle 300 could also have disengaged with any stator array or changed lanes at any point. The vehicle 300 may turn off of any path, whether VRM powered or not, onto any other suitable path without necessarily stopping or slowing down. All other vehicles, with or without converter assemblies and on-board control systems, can use any of the lanes or portions of lanes. The presence of stator arrays does not prevent vehicles without converter assemblies from using the lanes, nor do vehicles with converter assemblies have to engage the VRM system. This schematic representation is arbitrary in shape, direction, combination, length, etc. and is intended only to illustrate the operation of the hybrid VRM system. This arbitrary schematic may represent paths which are tens, hundreds, or thousands of kilometers long. Actual hybrid VRM systems may use other paths and combinations of paths.

Operation FIGS. 7 and 8

FIG. 7 is a logic flow diagram for operation of vehicles equipped with converter assemblies and an on-board VRM control system. The logic flow begins at logic point 700 where it is determined if a stator array is present in the path 302. The potential scenarios for operation are detailed in this logic flow diagram.

FIG. 8 shows the simplified block diagram of the integrated control system for this embodiment when the vehicle 300 is operating under complete or partial propulsive power from the VRM system. Block 810 represents the on-board vehicle control system. It consists of vehicle operator input 816 of desired acceleration, deceleration, and steering through typical interfaces 814 such as pedals and steering wheels. These typical vehicle control interfaces are equipped with transducers that signal the on-board VRM control system 812 to indicate the current driving state of vehicle 300. System 810 provides signals through the on-board VRM control system 812 to the stator control system 310. The stator control system 310 uses this data to help determine the sequence, magnitude and timing of powering of the electromagnets. The stator control system 310 and the on-board VRM control system receive signals from the grid control system 414 regarding the availability of electricity, traffic, weather, and any other information that may affect the operation of vehicle 300. The stator control system 310 also receives position and velocity data from the path based sensors 412a through 412LL. The stator control system 310 includes the switches that turn the electromagnets on and off, as well as the control system that regulates the electric current through the electromagnets. Line voltage is provided through an electrical power grid. The stator control system 310 also sends information to the grid control system 414. Whenever the vehicle is in the region of a stator array, information (load characteristics, billing information, etc.) is transmitted to the grid control system 414 by the on-board VRM control system 812.

Since the vehicle has a controllable on-board propulsive power source (internal combustion engine, battery electric, etc.) and a deceleration system (brake), the speed of the vehicle can be changed by adding or removing power through these typical systems (accelerator or brake). The on-board VRM control system 812 sends signals to the stator control system 310, and the in-road sensors 412a through 412LL (as applicable) also send signals indicating the changing velocity of the vehicle. These signals will allow the stator control system 310 to change the timing and power level of the subsequent electromagnets in the path.

The vehicle's on-board steering system allows the vehicle to enter or leave a region of roadway that is equipped with stator array at any time or at any point on the stator array. The vehicle's on-board steering system is also used to help guide and align the converter 306a and the converter 306b relative to the stator array 305. The attractive force between the stator electromagnets and converters 306a and 306b will also provide some passive guidance and alignment when the stator array 305 is operating. In other embodiments, an on-board electronic guidance control system may be utilized to guide the vehicle 300 when operating under VRM power.

The hybrid electric variable reluctance system provides a flexible method for providing partial or complete propulsive power to typical roadway vehicles. This propulsive power system does not require dedicated lanes, or right-of-way, for only vehicles equipped to operate using the hybrid VRM system. The hybrid nature of the system also allows for hybrid VRM vehicles to operate on any suitable path that is not supplied with the stator array. This allows for simple piece-by-piece implementation of the hybrid VRM system by installing stator arrays in regions where it is economically or environmentally advantageous. This hybrid system may be particularly advantageous for battery powered electric vehicles since it will extend the range of battery electric vehicles by providing propulsive power to the vehicle over long stretches of roadway. The hybrid VRM system also has the ability to charge the on-board batteries by turning one or more on-board generators attached to any of the wheels or through the powertrain. Extending the range and providing in-transit charging of battery-electric vehicles may significantly reduce the cost and mass of the batteries for battery-electric vehicles. Similar advantages are present for other non-typical power sources such as hydrogen, natural gas, etc. that have limited distribution. The system also provides a method to retrofit vehicles in the current fleet, thus enabling a quicker and more widespread adoption. Since the hybrid VRM system uses vehicles with on-board propulsive power sources, the system can be used to help balance the supply and demand on the electrical grid by controlling the amount of electricity that is available for VRM propulsion at any given time. This may be especially advantageous for electrical grids that include periodic renewable sources such as solar or wind.

Figure 9:
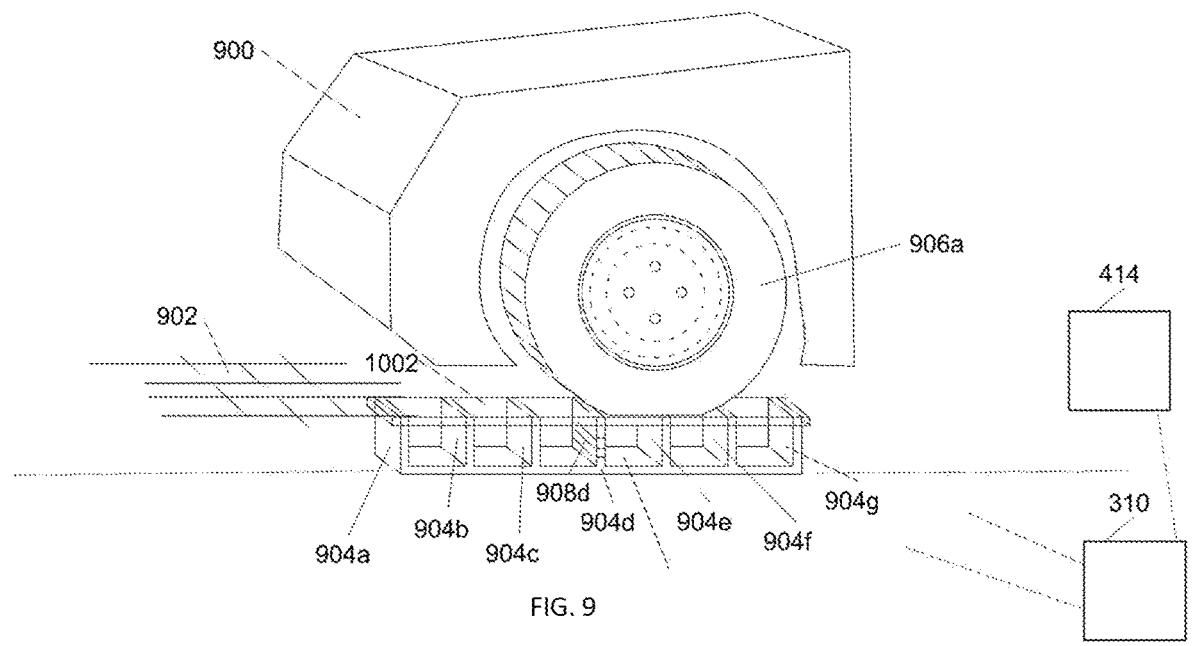
FIG. 9 shows a longitudinal flux embodiment of the hybrid variable reluctance motor (VRM) system.

Detailed Description—FIGS. 9—Second Embodiment

FIG. 9 shows a perspective view of the longitudinal magnetic flux embodiment of the hybrid VRM system. Most of the parts and assemblies of this embodiment are the same as the previously described transverse magnetic flux embodiment. The differences in parts and assemblies occur due to the orientation of the electromagnet poles in the stator array. In the longitudinal magnetic flux embodiment, the primary direction of the magnetic flux between electromagnet poles is in the longitudinal direction.

The vehicle 900 travels along a road, highway, or path 902. In this embodiment, the vehicle 900 is the same as vehicle 300, in the previous embodiment, except converter 906a replaces converter 306a, and converter 906b (not shown) replaces converter 306b. For this configuration the stator array is composed of a long comb stator 905. The stator 905 is composed of a long, approximately horizontal, ferromagnetic yoke which is connected to ferromagnetic poles 904a through 904g. An electric coil is wound around each pole. For clarity, only pole 904d is illustrated with a coil (coil 908d).

In this embodiment converters are only positioned on the driver's side of the vehicle, and a stator is only positioned on the driver's side of the path. In other embodiments, converters may be positioned at one or more of the vehicles wheels on either side of the vehicle, and stators may be positioned at one or more locations in the path across the width of the path (i.e., stator arrays lined up with both sides of the vehicle).

Only a segment of the stator 905, with a limited number of poles, is shown in FIG. 9. In this embodiment the actual number of poles extends indefinitely in either direction along the path 902. Multiple "comb" type stators may be positioned continuously or discontinuously along segments of the path 902 in the longitudinal direction. The stator control system 310 is connected to each coil of each pole in the stator 905. The on-board VRM control system (not shown) is wirelessly connected to the stator control system 310. There may be multiple stator control systems controlling different stators or portions of a stator array along the path 902.

As shown in FIG. 9, the converter 906a interfaces with a surface cover 1002 through rolling contact. The converter 906b (not shown) also interfaces with the surface cover 1002 through rolling contact. The top surface of the cover 1002 sits flush, or nearly flush, with the top surface of the path 902. The cover 1002 is made of aluminum plate with openings to allow for each electromagnet pole face to sit approximately flush with the top surface of the cover 1002.

Figure 9A:
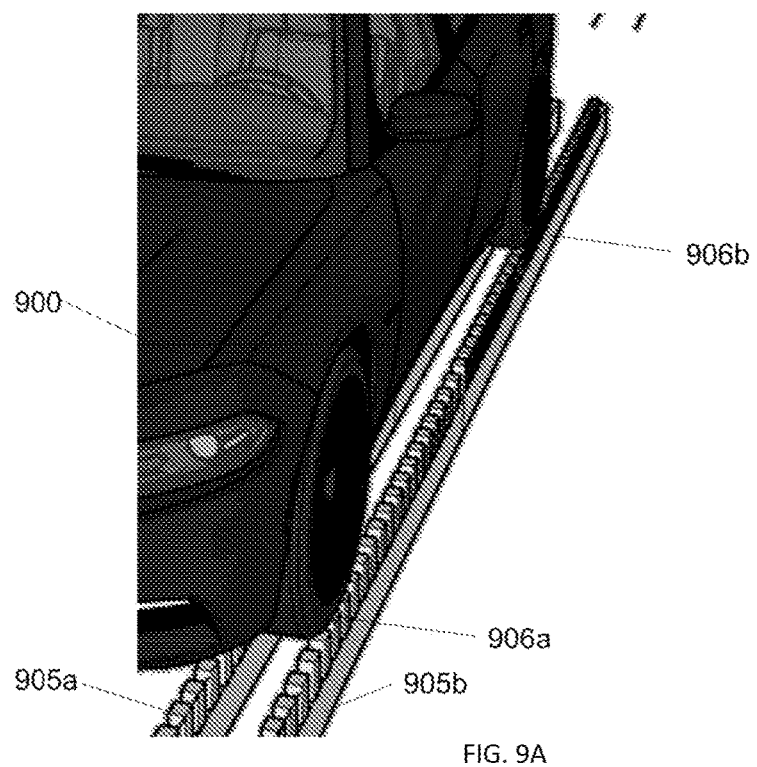
FIG. 9A shows a multi-stator embodiment of the longitudinal flux hybrid variable reluctance motor (VRM) system.

Other embodiments may position the electromagnet pole faces above or below the top surface of the cover 1002. Other embodiments may use other non-ferromagnetic material for the cover 1002, such as non-magnetic stainless steels, polymers, reinforced concrete, etc. Other embodiments may use a cover 1002 without openings for the electromagnet poles, and position the electromagnets so that the pole faces are just in contact with the bottom surface of the cover 1002 or below the bottom surface of the cover 1002. Other embodiments may attach ferromagnetic pole extensions into holes in the cover 1002, and then position the electromagnets so that the pole faces interface with the bottom surface of the pole extensions. Other embodiments, may use multiple "comb" type stator arrays, separated by non-ferromagnetic material, as shown in FIG. 9A where stator 905*a* and 905*b* are shown.

Position sensors similar to the previous embodiment, are placed in the cover 1002 between each pole.

The electromagnet poles shown in FIG. 9 are arranged in a longitudinal magnetic flux orientation. Taking pole 904*c* and pole 904*d* as a typical example, the poles are arranged such that the line connecting the center of the pole faces, is approximately aligned with the direction of vehicle travel. The direction of travel of the vehicle, is the longitudinal direction.

The electromagnet poles and yoke are constructed using well known materials, processes, and design features. The poles and yokes may be fabricated as individual pieces and then attached together, or they may be fabricated as a single piece. The coil 908*d* which is part of electromagnet 904*d*, is a typical example, and is made using insulated electrically conductive wire well known in the art. The coil 908*d* is only shown on pole 904*d*, and with only a small number of turns for clarity. The coil 908*d* is shown wrapped around the pole 904*d* in this embodiment. However, in other embodiments the coil 908*d* may be wrapped around the yoke between 904*c* and 904*d* or around a combination of pole 904*d* and the yoke between 904*c* and 904*d*. All of the other poles use similar coil configurations. For this embodiment the coil is made of AWG18 copper electromagnet wire with a varnish insulator typically used for electromagnets, with approximately 3000 turns around the pole. However, the coil may also be fabricated from other materials such as aluminum, aluminum with a copper sheathing, etc. and use other wire insulator materials. For other embodiments, the coil may be fabricated with different wire gages (cross-sectional areas) depending on the application and may use a different number of turns. The coil gage, material, and number of turns may vary from coil to coil. Each of the coils, coil 908*a* being exemplary, are connected to the stator control system 310. The stator control system 310 is connected to a direct current (DC) electric power source (not shown). For this embodiment, a DC electric power source is used. However, other embodiments may use an alternating current (AC) electric power source to supply the electromagnets, or an AC power source to supply the stator control system 310, which then converts the AC source to DC, using well known methods, to supply the electromagnets. In other embodiments, multiple and separate coils, which can be individually powered and controlled may be used on any pole or portion of yoke.

In FIG. 9 poles 904*a* through 904*g* have a substantially vertical orientation. In this embodiment the poles are in the approximate vertical orientation, and the pole faces in the approximate horizontal orientation. However, for other embodiments the poles may be angled relative to the longitudinal-normal plane, and/or the transverse-normal plane, and the pole faces may be angled relative to the longitudinal-transverse plane. The angle of the pole legs may also vary for each pole.

The stator 905 in FIG. 9, has poles spaced at an approximate center-to-center longitudinal distance of 20 cm (8 inches). However, the stator 905 can have poles spaced at different longitudinal distances based on application, terrain, expected load, typical vehicle type, embodiment, etc. The embodiment of FIG. 9 has poles with each pole face being of approximately equal area. Each pole face is rectangular, with approximate dimensions of 20 cm (8 inch) in the transverse direction, and 2.5 cm (1 inch) in the longitudinal direction. The pole cross-sectional area in the transverse-longitudinal plane is approximately constant along each pole leg, and in the longitudinal-normal plane along the yoke of the electromagnet. However, for other embodiments the pole face geometry and cross-section may be different from pole to pole, or in the yoke. In other embodiments, the electromagnet core cross-sections may also have different shapes such as circular, oval, triangular, polygonal, irregular and the cross-sectional shape may vary along the pole legs and across the yoke of the electromagnet. In this embodiment pole is approximately 15 cm (6 inches) long in the vertical direction. However, the pole length may have different lengths based on the application, region of the path, or expected load. The poles shown in FIG. 9 are arranged in an approximate linear fashion. However, the poles may be arranged along any path that is any arbitrary combination of approximately straight lines and curves provided the radius of any portion of a curved path is greater than approximately 12 m (40 ft) to maintain sufficient engagement of the converters 906*a* and 906*b* (not shown) with the stator array 905.

Figure 11:
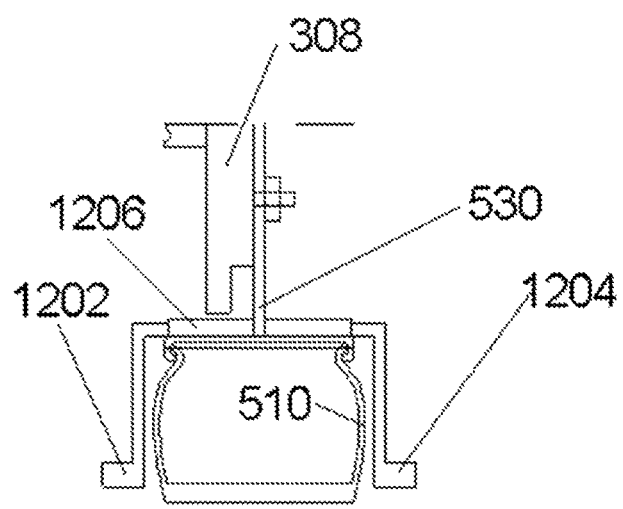
FIG. 11 shows a cross-section view (taken from a similar orientation as FIG. 10B) of an embodiment of a converter assembly which uses rigid ferromagnetic rims mounted on both outboard sides of the tire.

Detailed Description FIGS. 11, 11*a*, 11', and 11*b*

Figure 10A:
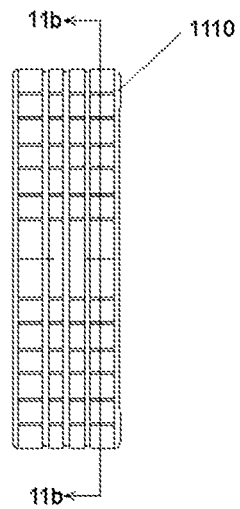
FIG. 10A shows a front view of the converter assembly used in one embodiment of a longitudinal flux hybrid VRM system (appears as a typical wheel).
Figure 10:
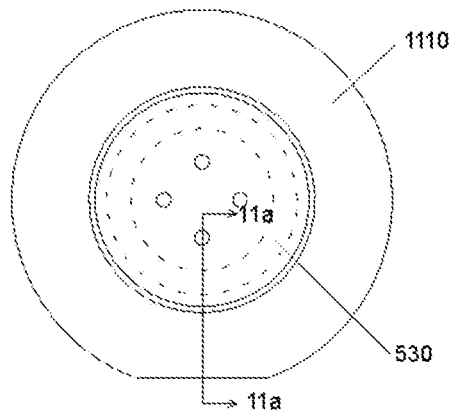
FIG. 10 shows a side view of the converter assembly used in one embodiment of a longitudinal flux hybrid VRM system (appears as a typical wheel).
Figure 10B:
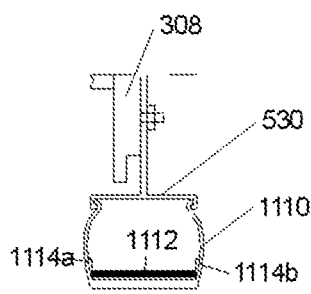
FIG. 10B shows a cross-section view of the converter assembly taken from FIG. 10. This converter assembly uses flexible ferromagnetic material in the tire.

FIG. 10 shows a front view of the converter 906*a* with section line references for FIG. 10B. FIG. 10A shows a side view of the converter 906*a* with the section line references for FIG. 10C. FIG. 10B is a cross-sectional view of the converter 906*a*. In FIG. 10B the vehicle hub 308, is attached to the rim 530, and an inflatable tire 1110 (in some embodiments tire 1110 may be the same as tire 510) is attached to the rim 530 using methods well-known in the art. Ferromagnetic material is positioned around the inside diameter of the tread region of the tire 1110 in a conformable ferromagnetic belt 1112. The width of the belt 1112 is approximately 20 cm (8 inches). A spacer 1114*a* is positioned between belt 1112 and the inner sidewall of the tire 1110. A spacer 1114*b* is positioned between belt 1112 and the outer sidewall of the tire 1110. The spacers 1114*a* and 1114*b* do not need to contain ferromagnetic material, and in this embodiment are rubber. The fabrication and attachment of the belt 1112 is similar to the transverse magnetic flux embodiment previously described. In other embodiments the ferromagnetic belt may consist of multiple belts positioned side-by-side in the transverse direction, or other formats previously described.

Figure 10C:
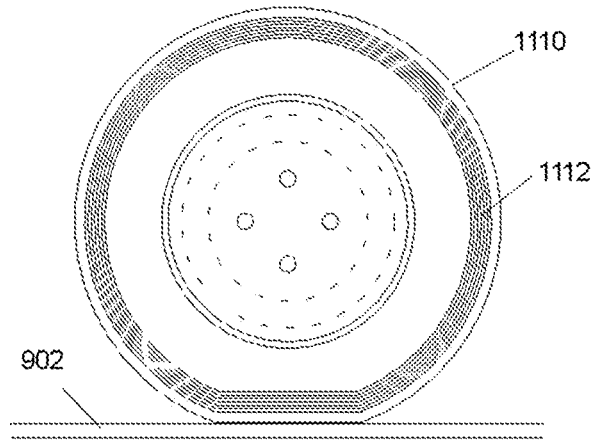
FIG. 10C shows a cross-section view of the converter assembly taken from FIG. 10A. This converter assembly uses flexible ferromagnetic material in the tire.

FIG. 10C shows a cross-section view of converter 906*a* through the belt 1112. The tire 1110 and belt 1112 deform to a substantially flat condition in the region of contact with the road. In this embodiment, the belt 1112 is made by spirally wrapping approximately 25 revolutions of a single piece of approximately 0.5 mm (0.02") thick by approximately 20 cm (8") wide rectangular cross-section silicon iron strip to produce a ferromagnetic belt that is approximately 38.1 mm (0.5") thick in the radial direction and 20 cm (8") wide in the transverse direction. The other aspects of the belt 1112 are similar to those described in the previous embodiment. The other methods and materials for producing a conformable ferromagnetic belt, described in the previous embodiment are also applicable to belt 1112.

Operation FIG. 9

Prior to the state shown in FIG. 9, where the vehicle 900 is being propelled by the hybrid VRM system, the vehicle 900 used the on-board engine and powertrain to accelerate from a low speed or stopped condition, to cruising speed. At the instant in time, time=t1, shown in FIG. 9, the hybrid VRM system is providing full propulsive power to the vehicle 900 through the stator array 905, and converters 906a and 906b.

To describe the operation of the hybrid VRM system an arbitrary scenario is considered. Assume that the vehicle 900 is traveling at a constant velocity of 31 m/s (70 mph). To maintain this velocity, I currently calculate a force in the approximate range of 400 N (90 lbf) to 800 N (180 lbf) must be applied to the vehicle 900 in the direction of travel. This velocity and range of forces equates to approximately 12.4 kW (16.6 hp) to 24.8 kW (33.2 hp) of propulsive power in the direction of travel. I currently estimate that approximately 30% of the electric power supplied to the hybrid VRM system will be converted to propulsive power (e_f=30%). Using this efficiency factor gives an approximate required electrical supply power of 41.33 kW to 82.67 kW. This required electric power is applied only to the poles in the stator array 905 which are currently powering the vehicle 900. The efficiency factor may vary for different regions, loads, and embodiments. In this embodiment, the vehicle 900 has two converters 906a and 906b engaged with the stator array 905, and this embodiment of the longitudinal flux VRM system is designed so that one pole in the stator array 905 is in powered interaction with each converter at any time. At the instant in time shown in FIG. 9 two electromagnets, 904d, and 904dd (not shown), are propelling the vehicle. This gives the approximate average required electric power at each pole interacting with converter 906a or 906b, at 20.67 kW to 41.33 kW. The velocity and power requirements used in this example are arbitrary, the hybrid VRM system could be used to propel the vehicle 900 at any typical vehicle velocity over various terrain and through various environmental conditions. For other embodiments that have different wheel diameters, vehicle loads, environments, efficiency factors, etc. the required electromagnet power will differ.

The production of the propulsive force in the direction of travel, on the Vehicle 900, by the hybrid VRM can be described by considering a specific instant in time illustrated in FIG. 9. At this time, denoted as time=t1, the central axis of rotation of the converter 906a is approximately centered over pole 904e. At time=t1 the poles 904a, 904b, 904c, and 904d, are powered, and each has been powered for a different amount of time prior to time=t1. In this embodiment, every other pole alternates between "north" and "south" sense poles, this allows the magnetic flux to flow out of one pole and into two adjacent poles. The sense of the poles, either "north" or "south" is determined by the direction of the electric current and the direction of the wrap of the electric coil. A portion of the magnetic field emanating from the pole 904d crosses the air gap and enters the ferromagnetic conformable belt 1112, flows thru the belt 1112 in two circumferential directions, and then crosses air gaps to enter poles 904c and 904e, respectively. The flux flows thru the yoke regions and back to pole 904d to complete the magnetic circuit. As the magnetic field from pole 904d interacts with the ferromagnetic conformable belt 1112 in converter 906a, a force is produced that tends to close the air gap between converter 906a, and pole 904d. The electromagnetic forces that tend to close the air gap cause the converter 906a to rotate in the counterclockwise direction (when viewed looking from the driver's side looking toward passenger's side). Through friction, the path 902 reacts force from the rotation of converter 906a, resulting in a translation of vehicle 900. The hybrid VRM also imposes a direct component of force in the direction of travel on the converter 906a which also contributes to the translation of vehicle 900.

At time=t1, the magnetic fields from the energized poles 904a, 904b, and 904c do not significantly interact with the converter 906a, but energy is stored in the magnetic fields. A portion of the stored magnetic field energy will contribute to the vehicle propulsive force when the converter 906a reaches the appropriate position. At time=t1, poles 904a. 904b, and 904c are denoted as pre-powered poles. For electromagnets 904a, 904b, and 904c the magnetic flux flows mainly between the adjacent poles (i.e., the minimum reluctance path is through the air between the poles, not yet through the converter), without significantly interacting with the converter 906a. In this embodiment, three poles are pre-powered, in other embodiments or in other regions of the path 902, the number of pre-powered poles may vary.

Poles 904f and 904g are still in the general region of the converter 906a, but are turned off because they are on the outbound side of the converter 906a. There is no significant magnetic interaction force occurring between electromagnet 904f and 904g and the converter 906a, only a small amount due to residual magnetic fields in the poles. Reversing the sign of the electric current in the "outbound side" poles may be used to minimize the residual attractive force between the outbound side poles and the converter 906a.

At time=t2 (not shown) vehicle 900 will have traveled along the path, to a position on the stator 905 where the air gap between pole 904d and the converter 906a has just closed. At approximately time=t2, pole 904d will be turned off. Other embodiments may turn off a pole prior to air gap closure, or after air gap closure. Pole 904c will remain energized at time=t2, with the magnetic field from 904c continuing to interact with the ferromagnetic material in converter 906a, thereby exerting forces on 906a that tend to close the gap between the converter and pole 904c. Approximately at time=t2, pole 904b will begin to interact more significantly with the ferromagnetic material in converter 906a, and thereby contribute to the propulsive power for vehicle 900. Also approximately at time=t2, the next pole on the inbound side of the stator (not shown) will be pre-powered and begin storing energy in its magnetic field. This process of sequentially powering and turning off poles continues in time as the vehicle 900 travels along the path. The timing and magnitude of the powering of the electromagnets may vary depending on input from the operator to the on-board VRM control system, signals from the ground based stator control system 310, and/or grid control system 414. The timing and magnitude may also vary for other embodiments where the vehicle load is different or the diameter of the converters are different. The same process is used to produce propulsive power through converter 906b (rear driver's side of vehicle 300) and the poles that are local to converter 906b at any given time.

Operation FIG. 10B

The cross-section FIG. 10B, is taken through the ferromagnetic conformable belt 1112. As shown in FIG. 10B the belt 1112 conforms to substantially flat condition over the region where the tire 1010 contacts the path 902. For this embodiment the ferromagnetic material used in the converter 906a, which comes in the form of a conformable belt 1112, not only rotates about the central axis of the converter 906a, but also translates radially to conform to the path 902. The same rotation and translation occurs in all of the ferromagnetic belts in converter 906a and converter 906b.

Other embodiments may also use completely different format for the ferromagnetic conformable belts. The main features of any ferromagnetic conformable belt are: ferromagnetic material in sufficient quantity to form a low reluctance magnetic flux path, sufficient attachment to the tire so that loads from the magnetic field can be transferred to the tire, flexibility to conform with the tire, sufficient fatigue resistance to last the useful life of the tire, and structural reinforcement sufficient to tolerate the centripetal load from the rotating wheel.

The control and use of this embodiment is essentially the same as the first embodiment.

DETAILED DESCRIPTION—FIG. 11—THIRD EMBODIMENT

An alternate converter configuration can be used with transverse flux hybrid VRM embodiments similar to the first embodiment described herein. A cross-section of this converter embodiment is shown in FIG. 11. In this embodiment the converter uses removable rigid ferromagnetic rims 1202 and 1204 mounted to the typical rim 530 outside of the tire 510. A low reluctance ferromagnetic bridge 1206 provides a low reluctance path in the transverse direction between the ferromagnetic rims 1202 and 1204. The ferromagnetic rims 1202 and 1204 are connected to the bridge 1206 using a bolted connection. The bridge 1206 is connected to the rim 530 using a bolted connection. Other embodiments may use other connections such as clamps, threads, pins, etc. The ferromagnetic rims 1202 and 1204 are each approximately 0.5" wide and 1.5" thick in the outer diameter regions of the ferromagnetic rims. The rim thickness can then decrease to 0.1" or less and may have lightening holes/features. The outside diameter of the ferromagnetic rims is approximately 1" less than the diameter of a properly inflated tire 510. In this embodiment the pole-to-pole spacing in the transverse direction is 10".

Other embodiments may use a ferromagnetic rim 530, and connect the ferromagnetic rims 1202 and 1204 directly to the rim with bolted connections.

A similar embodiment of this converter can be used with a longitudinal flux hybrid VRM embodiments similar to the second embodiment described herein, but with two stator arrays in the same channel, separated transversely by non-ferromagnetic material, similar to FIG. 9a. When used in a longitudinal flux configuration the bridge 1206 is eliminated ant the rims 1202 and 1204 are mounted directly to the rim 530. The geometry of the outer ring of the rims 1202 and 1204 are also modified being approximately 1.4" wide and 2.8" thick each.

Operation—FIG. 11

Operation of the hybrid VRM system using the converter configuration shown in FIG. 11 is the same as described in the transverse flux VRM system described in the first embodiment.

Operation of the hybrid VRM system using the modified converter configuration for longitudinal flux VRM systems is similar to the description the second embodiment.

Figure 12:
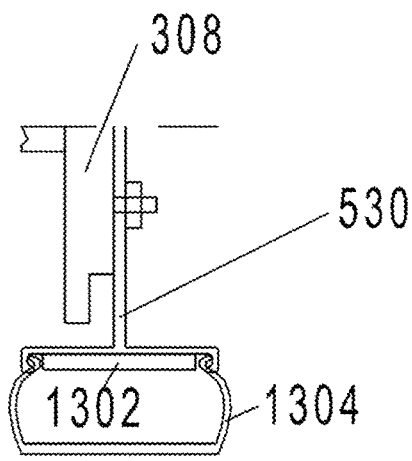
FIG. 12 shows a cross-section view (taken from a similar orientation as FIG. 10B) of an embodiment of a converter assembly which uses a low-profile tire and rigid ferromagnetic material.

Detailed Description—FIG. 12—Fourth Embodiment

An alternate converter configuration can be used with transverse flux hybrid VRM embodiments similar to the first embodiment described herein. A cross-section of this converter embodiment is shown in FIG. 12. In this embodiment the converter uses removable rigid ferromagnetic segments 1302 mounted to the typical rim 530 using bolted connections. In this embodiment the ferromagnetic material is inside of the pressurized volume of the tire 1304. The tire 1304 is a very low profile tire similar to many tires well known in the art. The ferromagnetic segments 1302 have features on each end that are approximately 0.5" wide in the transverse direction and 1.5" thick in the radial direction, with the material between these thickened regions being approximately 0.25" thick.

Other embodiments may incorporate the ferromagnetic segments into the structure of the rim 530.

A similar embodiment of this converter can be used with a longitudinal flux hybrid VRM embodiments similar to the second embodiment described herein. When used in a longitudinal flux configuration the rigid ferromagnetic segments 1302 are approximately uniform thickness of 0.25".

Operation FIG. 12

Operation of the hybrid VRM system in a transverse flux embodiment, using the converter configuration shown in FIG. 12 is the same as described in the transverse flux VRM system described in the first embodiment.

Operation of the hybrid VRM system in a longitudinal flux embodiment, using the modified converter configuration shown in FIG. 12 is the same as described in the longitudinal flux VRM system described in the second embodiment.

Figure 13:
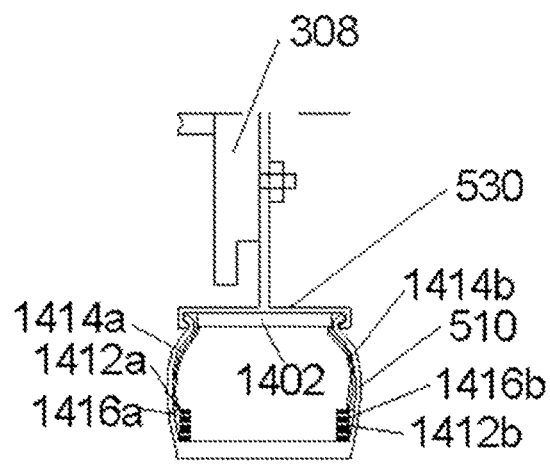
FIG. 13 shows a cross-section view (taken from a similar orientation as FIG. 10B) of an embodiment of a converter assembly which uses flexible ferromagnetic material in the tire connected to rigid ferromagnetic material connected to the rim.
Figure 14:
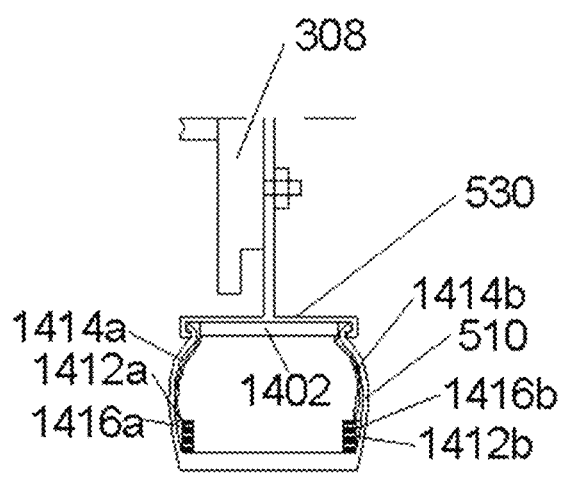

Detailed Description—FIG. 13—Fifth Embodiment

An alternate converter configuration can be used with transverse flux hybrid VRM embodiments similar to the first embodiment described herein. A cross-section of this converter embodiment is shown in FIG. 13. In this embodiment the converter uses conformable belts 1412a and 1412b mounted to the inside diameter of the tread region of the tire 510 similar to the first embodiment. This embodiment uses flexible ferromagnetic vertical connectors 1414a and 1414b that are mounted to spacers 1416a and 1416b respectively. The vertical connectors 1414a and 1414b run up the inside of the sidewalls of the tire 510 to a point where they meet the removable rigid ferromagnetic segments 1402 mounted to the typical rim 530 using bolted connections. The flexible vertical connectors 1414a and 1414b are made of wire mesh, wire rope, ferromagnetic particles, bars, strips, or sheets in a flexible carrier. The conformable belts 1414a and 1414b are approximately 0.5" wide in the transverse direction and 1.5" thick in the radial direction.

Operation FIG. 13

Operation of the hybrid VRM system using the converter configuration shown in FIG. 13 is the same as described in the transverse flux VRM system described in the first embodiment.

Advantages

From the descriptions above, a number of advantages of some embodiments of my hybrid VRM system become evident:

a. The flexibility to use the system in conjunction with other propulsion sources such as internal combustion engines or battery powered motors
b. Simple integration of the required components into typical vehicles and roadways, even thru retrofit.
c. The size of the electromagnets, number of control systems, and number of switches can be minimized providing a substantially cost competitive propulsion system.
d. Enables smart grid technologies that will allow utilities to better balance the load on the grid by using the in-roadway system as an adjustable output.
e. Enabling technology for renewable power sources, either at the individual or utility scale, that may have periodic output since the in-roadway system can be energized when the renewable sources are available, but the renewable sources are not required to continue travel by typical methods.
f. Can be integrated into the existing fleet of vehicles and does not require exclusive dedicated lanes, or right-of-way, thus the roadways may be used with all types of vehicles. These considerations offer a practical way of introducing the technology into the existing fleet of vehicles without requiring all vehicles to adopt the technology, it can be phased in mile-by-mile and lane by lane as demand justifies the implementation of the system.

CONCLUSION, RAMIFICATIONS, AND SCOPE

Accordingly, the reader will see that the various embodiments of the hybrid VRM transportation system can be used to provide a flexible and adaptable transportation system which can compete with typical petroleum powered systems currently used. Various embodiments enable the implementation of other alternate propulsion sources such as battery electric vehicles and natural gas powered vehicles. Furthermore, the hybrid VRM system can enable greater use of periodic renewable energy sources by using these sources when available, by allowing the vehicles to use on-board power when the renewable sources are not available. This adaptable system also allows for utility companies to better balance supply and demand of electricity.

Although the description above contains many specificities, these should not be construed as limiting the scope of the embodiments but as merely providing illustrations of some of several embodiments. For example, other converter configurations are possible, such as mounting a rigid ferromagnetic rim between two tire/rim assemblies (similar to a well-known dual wheel configuration), or converters may utilize rigid ferromagnetic material that has an adjustable radial position.

Thus the scope of the embodiments should be determined by the appended claims and their legal equivalents, rather than by the examples given.

I claim:

1. A hybrid propulsion system for vehicles comprising:
a vehicle for traveling on a roadway,
at least a portion of said roadway includes a plurality of paths,
at least one on-board engine connected to said vehicle for providing at least a portion of propulsion power required to travel along any portion of said roadway,
at least one stator array conprising a plurality of electromagnet poles arranged along at least a portion of said path for an electrically powered variable reluctance motor system,
said vehicle connected to at least one hub, said hub rotates about a central axis,
at least one converter assembly including one said hub and at least one arrangement of ferromagnetic material,
said hub mechanically connected to said arrangement of ferromagnetic material for use in said electrically powered variable reluctance motor system,
said arrangement of ferromagnetic material configured to travel a closed loop path around said hub,
at least one integrated control system,
said integrated control system includes a stator control system for at least partial control of the magnetic field of each said electromagnet poles,
said integrated control system includes a network of control sub-systems for at least partial control of a velocity of said vehicle,
wherein signals are received and processed by an on-board variable reluctance motor control system, said on-board variable reluctance motor control system is configured to signal said stator control system to sequentially operate said electromagnet poles,
whereby said vehicle is propelled along said roadway.

2. The system of claim 1, wherein said electromagnet poles are arranged in a longitudinal flux configuration, and
adjacent poles of said electromagnet poles are positioned approximately parallel to said path.

3. The system of claim 1, wherein said electromagnet poles are arranged in a transverse flux configuration,
said electromagnet poles are arranged in a plurality of sets,
adjacent said sets are positioned approximately parallel to said path, and
said electromagnetic poles of each said set are oriented approximately perpendicular to said path.

4. The system of claim 1, wherein said network of control sub-systems further comprising a grid control system, said grid control system signals said stator control system, and said stator control system sequentially powers said electromagnet poles.

5. The system of claim 1, wherein the arrangement of ferromagnetic material is embedded in a tire of said vehicle.

6. The system of claim 1, wherein said arrangement of ferromagnetic material is attached to an internal surface of a pneumatically inflated vehicle tire.

7. The system of claim 1, wherein said arrangement of ferromagnetic material is constrained to rotate substantially rigidly about said central axis and a flexible tire of said vehicle.

* * * * *